Aug. 19, 1930.                R. P. LANSING                1,773,107
                              ENGINE STARTER
                       Filed Sept. 23, 1926        2 Sheets-Sheet 2
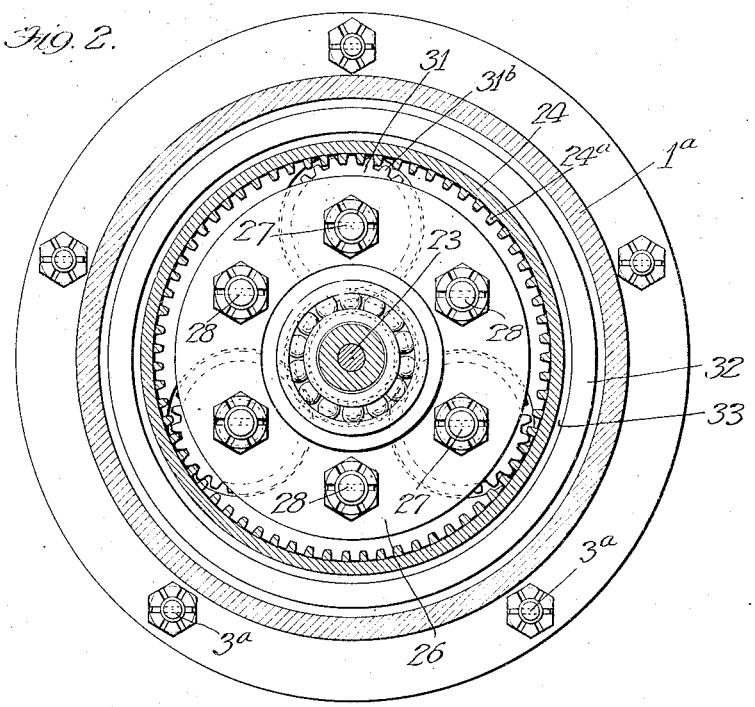
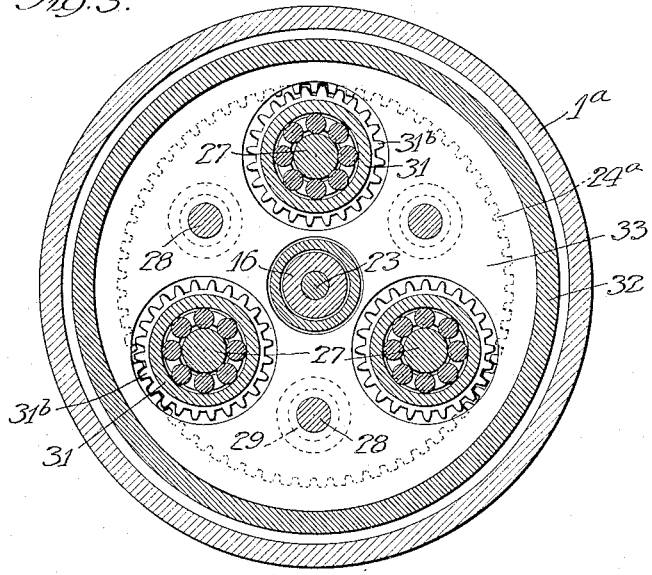

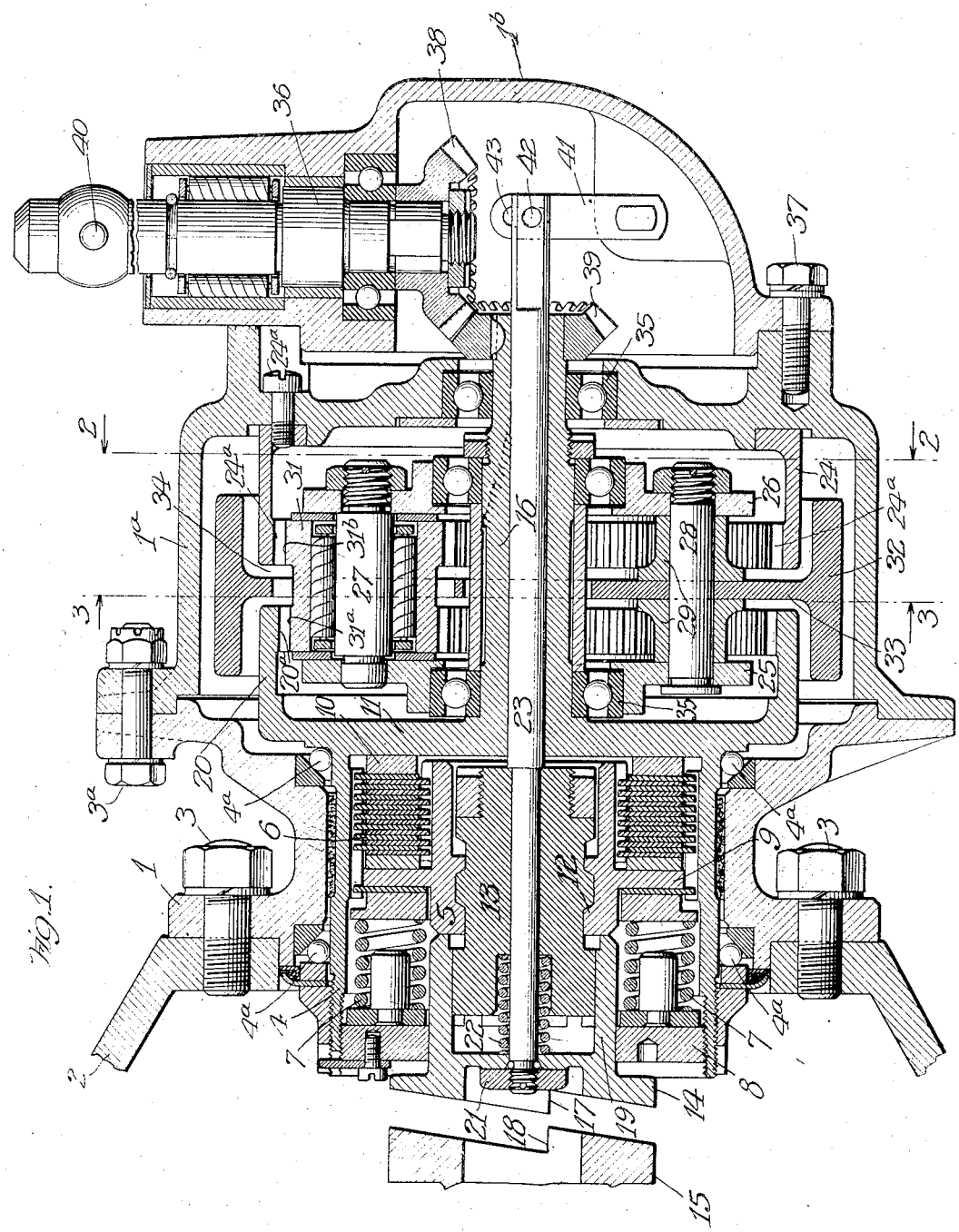

Patented Aug. 19, 1930                                                            1,773,107

UNITED STATES PATENT OFFICE

RAYMOND P. LANSING, OF MONTCLAIR, NEW JERSEY, ASSIGNOR TO ECLIPSE MACHINE COMPANY, OF ELMIRA, NEW YORK, A CORPORATION OF NEW YORK

ENGINE STARTER

Application filed September 23, 1926. Serial No. 137,374.

My invention relates to engine starting apparatus for the starting of engines, such as internal combustion engines, and more particularly but not necessarily airplane engines, and the object thereof is to provide a simple, efficient and reliable apparatus characterized by the provision of a unitary and combined assembly of reduction means, such as planetary gearing, and inertia means, such as a flywheel, which is put into rapid rotation by suitable starting means, either manual or power, or both, and then caused to engage and crank a member of the engine to be started through the medium of suitable transmission mechanism.

In the drawings, Figure 1 is a sectional elevation of an apparatus embodying my invention and Figs. 2 and 3 sections taken on the corresponding section lines of Fig. 1.

My apparatus comprises a transmission or drive including an element hereinafter designated a driving member which is adapted to engage and crank a member of the engine to be started, reduction means such as planetary gearing and inertia means such as a flywheel combined with said reduction gearing, and starting means for actuating said gearing and flywheel and consequently the drive in the operation of the engine. In so far as my present invention is concerned, any suitable starting means may be employed, such as manual means or power means, or both, but in the present instance I have shown merely manually operated means. Also in so far as my present invention is concerned, any desired transmission or drive may be employed between the reduction gearing and the member of the engine to be started and the transmission or drive herein illustrated, being efficient and suitable for the purpose, is selected for the purpose of a definite and clear description of my apparatus and invention without limitation thereto.

First describing the transmission or drive, the same is located within a main casing 1 which is suitably supported as by being detachably connected with the crank case 2 of the engine in suitable manner as by means of bolts 3, a small portion of which crank case is illustrated. Within the casing there rotates a driving barrel 4 and a control member or nut 5 located and operating concentrically therein and operatively connected with the barrel by a yieldable driving connection which is here in the form of a friction clutch 6. This clutch is composed of two sets of disks which are splined respectively to the interior of the barrel and to a right hand extension (Fig. 1) of the nut. The proper pressure for the disks is provided by a series of springs 7 located within the barrel and such pressure is regulated by the adjustable ring 8 screwing in the interior of the barrel at the left hand end thereof. The thrust of these springs is against the flange 9 of nut 5 and tends to force such nut inwardly and consequently force the clutch disks against the spacing ring 10 into frictional contact with each other.

The nut 5 is provided with internal long lead threads 12 on which is threaded a screw shaft 13 constituting the main portion of the so-called driving member whose other principal portion is a clutch member 14 adapted to engage a member of the engine to be started, such as the corresponding clutch member 15 which may form a part of or be secured to any rotatable part of the engine such as the crank shaft thereof (not shown). The member 14 has clutch jaws 17 adapted to engage complementary clutch jaws 18 on the engine member which jaws are adapted to become automatically disengaged when the engine starts on its own power. The clutch member 14 is splined to the outer end of the screw shaft 13 whereby such parts have a relative longitudinal movement of limited degree independent of each other.

The clutch member 14 is held in outward position with a yielding pressure in suitable manner as by means of a coiled spring 22 which bears at its outer end against the bottom of the sleeve 19 and at its inner end against the bottom of a socket formed in the outer end of the screw shaft. The outward movement of the member 14 is limited by the nut 21 screwing onto the outer or left-hand end of an operating rod 23 which passes centrally through the driving parts and through the reduction gearing hereinafter described and is in the present instance manually operated.

The driving barrel 4 is made of the peculiar and particular shape or formation illustrated in Fig. 1, according to which such barrel has an end or bottom portion 11 and a central extended hub 16 which is of considerable length and which has a central bore to receive the rod 23. Said end portion 11 is further provided with a shell extension 20 which is provided internally with a ring of gear teeth 20$^a$, cooperating with the reduction gearing hereinafter described. By preference the barrell is provided with anti-friction bearings 4$^a$ within the casing 1.

Next describing the reduction means, the same is in the form of planetary gearing contained within a second casing 1$^a$ and secured to the casing 1 in suitable manner as by means of the bolts 3$^a$. A stationary internal gear 24 is secured to the casing 1$^a$ in suitable manner as by screws 24$^a$ and with the stem there meshes a series of three planetary gears 31. These gears are journaled by means of the studs 27 in a cage formed by the two parallel plates 25 and 26. These plates are spaced apart by means of the studs 28 and spacing sleeves 29. Each of the pinions 31 has two rows of gear teeth 31$^a$ and 31$^b$, the teeth being of different number, in the present instance there being one more tooth in the row 31$^b$ than in the row 31$^a$. The row of teeth 31$^a$ meshes with the teeth 20$^a$ of the driving barrel and the teeth 31$^b$ mesh with the teeth 24$^a$ of the stationary internal gear 24.

The inertia means here comprises a flywheel consisting of a weighted mass or rim 32 and a web 33. This flywheel is combined with and forms a part of the unitary structure or assembly of reduction means and inertia means and to this end the reduction gearing is secured to the web of the flywheel by means of the studs 28, such web being clamped between the spacing sleeves 29, as shown in Fig. 1. This web of the flywheel encompasses the planetary pinions 31 inasmuch as suitable enlarged openings are provided in such web to accommodate such pinions and such web extends through the space provided between the shell extension 20 and the internal gear 24$^a$ which are in the same plane but separated in order to form the opening 34 between them, through which the web of the fly wheel passes, as described.

This entire assembly of reduction means and inertia means is supported by and mounted to rotate upon the hub 16 of the driving barrel preferably through the medium of the ball bearings 35. The inertia means and the reduction gearing therefore have a common axis and the inertia means is concentric with respect to the reduction gearing and hub of the driving barrel. Moreover, the combined and unitary structure provides for great compactness and the reduction gearing may be utilized for inertia functions, thereby permitting the flywheel rim to be made inherently lighter than it would otherwise be. The inertia means constitutes a reservoir for the storage of energy and is characterized by the fact that enough energy can be stored therein for cranking the engine regardless of the fact that the application of power to the starting means is discontinued during the cranking operation.

As hereinbefore stated, any suitable starting means may be employed and in the present instance I have shown manually operated means comprising a crank shaft 36 journaled in an end casing 1$^b$ secured to the casing 1$^a$ in suitable manner as by means of the screws 37. This shaft is provided with a bevel gear 38 meshing with a corresponding bevel gear 39 secured to one end of the hub 16 of the barrel. This shaft 36 is provided with suitable pins 40 to receive an ordinary hand crank, not shown.

The rod 23 is manually operated through any suitable connections as, for instance, the lever 41 and the pin and slot connection shown at 42 and 43.

Describing a cycle of operation and beginning with the parts in their normal position shown in Fig. 1, the operator applies a hand crank to the crank shaft 36 and rotates the same with the result that the driving barrel will be rotated and also the reduction gearing and the inertia means or flywheel by reason of the gearing connection between the shell extension 20 and the reduction gearing. As a result, the flywheel will in time acquire a very rapid rate of rotation and when a sufficient degree of rotation is secured further hand cranking is discontinued and the rod 23 is manually thrust to the left, Fig. 1, whereby the clutch member 14 of the driving member is brought into driving engagement with the engine member 15. The torque of the rotating parts, including the considerable amount of energy stored up in the rapidly rotating flywheel as well as in the reduction gearing, is thereby transmitted and applied to the engine member and the engine is thereupon cranked. When the engine starts on its own power the clutch members 14 and 15 are automatically disengaged by reason of the inclined formation of the clutch jaws 17 and 18.

In the present instance there is a difference of one tooth between the two rows of teeth of the planetary pinions 31 and therefore a high gear reduction results between the flywheel and the barrel. In the structure shown in the drawing, one revolution of the barrel corresponds to fifty revolutions of the flywheel.

Besides the advantage due to the fact that the entire planetary cage of reduction gearing is rigidly mounted on the flywheel web and contributes to the storage and dissipation of energy together with the flywheel and enables the flywheel rim to be inherently lighter than otherwise, there is the further advantage of the obtaining of perfect concentricity of all of the parts, including the casings and the rotating parts therewithin, which fact lends itself particularly to accurate manufacture and assembly especially at comparatively low cost.

I claim:

1. An engine starter having a drive including a driving member adapted to drive a member of the engine to be started, starting means for actuating the driving member, and combined reduction gearing and a flywheel inertia device constituting component parts of each other and cooperating with the driving member.

2. An engine starter having a drive including a driving member adapted to drive a member of the engine to be started, starting means for actuating the driving member, and combined reduction gearing and inertia means cooperating with the driving member and arranged concentric of such gearing, said gearing being of the planetary type including a rotatable cage and revolving planetary pinions therein, and the inertia means being a flywheel whose web is secured to said cage.

3. An engine starter having a drive including a driving member adapted to drive a member of the engine to be started, starting means for actuating the driving member, and combined reduction gearing and inertia means cooperating with the driving member and arranged concentric of such gearing, said gearing being of the planetary type having a cage including two parallel rotatable plates, and the inertia means being a flywheel whose web is secured to said cage and located between said plates.

4. An engine starter having a drive including a driving member adapted to drive a member of the engine to be started, starting means for actuating the driving member, and combined reduction gearing and inertia means cooperating with the driving member and arranged concentric of such gearing, said gearing being of the planetary type having a cage including two parallel rotatable plates, and planetary pinions and spacers between such plates, and the inertia means being a flywheel whose web encompasses such pinions and is secured by said spacers between the plates.

5. An engine starter having a drive including a driving member adapted to drive a member of the engine to be started, starting means for actuating the driving member, and combined reduction gearing and inertia means cooperating with the driving member and arranged concentric of such gearing, said gearing being of the planetary type including a rotatable cage and revolving planetary pinions therein, and the inertia means being a flywheel whose web is secured to said cage, the rim of the flywheel being concentric of such gearing and parallel to its axis of rotation.

6. An engine starter having a drive including a rotatable barrel, a driving member actuated thereby and adapted to drive a member of the engine to be started, said barrel having a projecting hub, and means including reduction gearing and inertia means mounted upon said hub, and starting means for rotating said hub.

7. An engine starter having a drive including a rotatable barrel, a driving member actuated thereby and adapted to drive a member of the engine to be started, said barrel having a shell extension and a projecting hub, starting means for rotating said hub, and means including reduction gearing and inertia means mounted upon said hub, said gearing cooperating with said shell extension.

8. An engine starter having a drive including a rotatable barrel, a driving member actuated thereby and adapted to drive a member of the engine to be started, said barrel having a projecting hub, starting means for rotating said hub, and combined reduction gearing and inertia means mounted upon said hub, said gearing being operatively connected with and driven by said hub.

9. An engine starter having a drive including a rotatable barrel, a driving member actuated thereby and adapted to drive a member of the engine to be started, said barrel having a shell extension and a projecting hub, starting means for rotating said hub, and combined reduction gearing and inertia means mounted upon said hub, said gearing cooperating with said shell extension and including a stationary circular gear and planetary pinions cooperating with said circular gear and with said shell extension.

10. An engine starter having a drive including a rotatable barrel, a driving member actuated thereby and adapted to drive a member of the engine to be started, said barrel having a shell extension and a projecting hub, starting means for rotating said hub, and combined reduction gearing and inertia means mounted upon said hub, said gearing cooperating with said shell extension and including a stationary circular gear in the same plane as said shell extension but spaced therefrom, and said inertia means comprising a flywheel to whose web said gearing is secured and which extends through said space between the circular gear and the shell extension.

11. An engine starter having a drive including a rotatable barrel, a driving member actuated thereby and adapted to drive a member of the engine to be started, said barrel having a circular rotatable gear ring, a stationary gear ring adjacent thereto, and combined reduction gearing and inertia means mounted upon said hub, said gearing cooperating with said two gear rings.

12. An engine starter having a drive including a rotatable barrel, a driving member actuated thereby and adapted to drive a member of the engine to be started, said barrel having a circular rotatable gear ring, a stationary gear ring adjacent thereto, and combined reduction gearing and inertia means mounted upon said hub, said gearing including a series of planetary pinions, each having two rows of gear teeth of unequal number and cooperating respectively with said two gear rings.

13. An engine starter having a drive including a rotatable barrel, a driving member actuated thereby and adapted to drive a member of the engine to be started, said barrel having a hub and a circular rotatable gear ring, a stationary gear ring adjacent thereto, and combined reduction gearing and inertia means mounted upon said hub, said two gear rings being in the same plane but having a space between them, and said inertia means comprising a rim and a web to which latter the reduction gearing is secured and which extends through said space, the rim of the flywheel being extraneous of and concentric with said gear rings.

14. An engine starter having a drive including a rotatable barrel, a driving member actuated thereby and adapted to drive a member of the engine to be started, said barrel having a projecting hub, combined reduction gearing and inertia means mounted upon said hub, starting means for rotating the hub, and a rod passing through said hub and adapted to move the driving member into engagement with the engine member.

15. An engine starter having a drive including a rotatable barrel, a driving member actuated thereby and adapted to drive a member of the engine to be started, said barrel having a projecting hub, combined reduction gearing and inertia means mounted upon said hub, starting means for rotating the hub, and a manually operated rod passing centrally through said hub and adapted to move the driving member into engagement with the engine member.

16. An engine starter having a drive including a driving member adapted to crank a member of the engine to be started, combined reduction gearing and inertia means including a rotatable inertia mass and gear mechanism carried by and augmenting said mass and substantially balanced with respect to its axis of rotation, said gearing being adapted and arranged to actuate said driving member, and starting means adapted and arranged to actuate said inertia mass through said gearing.

17. An engine starter having a drive including a driving member adapted to drive a member of the engine to be started, starting means for actuating the driving member, reduction gearing and a flywheel inertia device cooperating with the driving member, said flywheel surrounding the gearing.

18. An engine starter having a drive including a driving member adapted to drive a member of the engine to be started, starting means for actuating the driving member, and combined inertia and reduction means cooperating with the driving member, said combined means comprising a web carrying gearing and a flange surrounding such gearing.

In testimony whereof, I have subscribed my name.

RAYMOND P. LANSING.